E. GRAHAM.
LAND TORPEDO.
APPLICATION FILED NOV. 17, 1917.
1,350,220.
Patented Aug. 17, 1920.
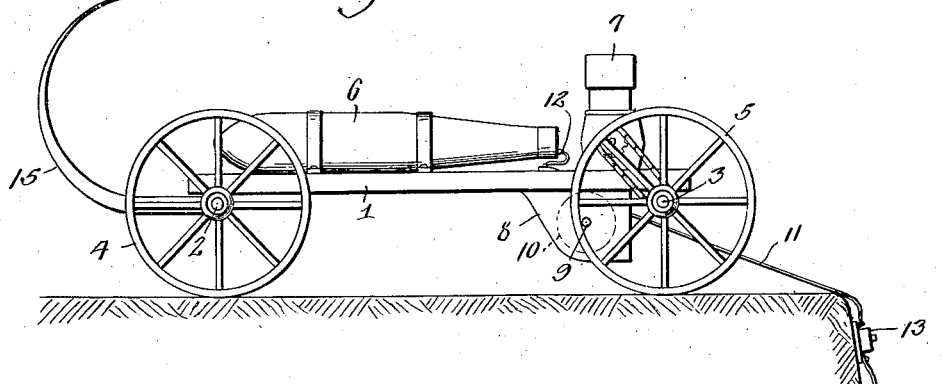
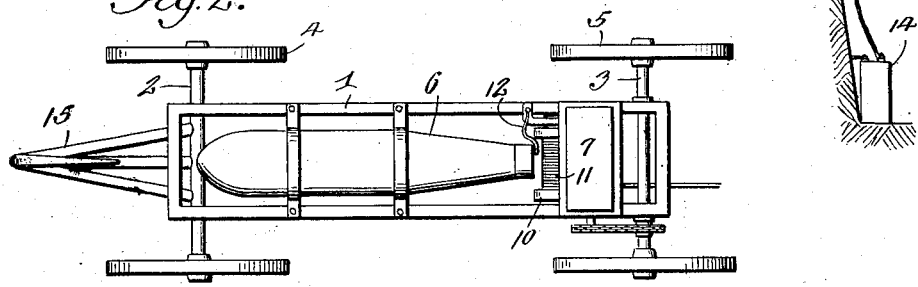
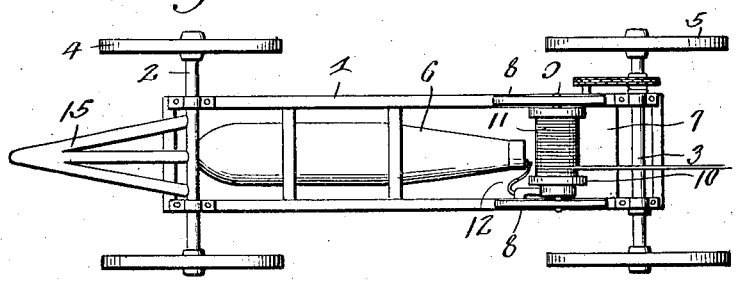
INVENTOR
E. Graham,
BY Victor J. Evans
ATTORNEY
WITNESSES

UNITED STATES PATENT OFFICE.

EDWARD GRAHAM, OF SAGINAW, MICHIGAN.

LAND-TORPEDO.

1,350,220.   Specification of Letters Patent.   Patented Aug. 17, 1920.

Application filed November 17, 1917. Serial No. 202,589.

*To all whom it may concern:*

Be it known that I, EDWARD GRAHAM, a citizen of the United States, residing at Saginaw, in the county of Saginaw and State of Michigan, have invented new and useful Improvements in Land-Torpedoes, of which the following is a specification.

This invention relates to land torpedoes, the object in view being to provide what may be termed a wheeled torpedo embodying in combination, a wheeled truck or frame, a torpedo or explosive shell mounted thereon, propelling mechanism including a motor or engine, and a reel upon which the electric current wires are mounted and by means of which said wires are adapted to be paid out or unreeled automatically as the torpedo is driven under its own power toward the enemy.

With the above and other objects in view, the invention consists in the novel construction, combination and arrangement of parts, herein described, illustrated and claimed.

In the accompanying drawing:—

Figure 1 is a side elevation of the land torpedo showing the manner in which it is launched or started from a trench.

Fig. 2 is a top plan view of the same.

Fig. 3 is a bottom plan view thereof.

In the preferred embodiment of this invention, I employ a truck frame 1, front and rear axles, 2 and 3, respectively, and front and rear carrying wheels 4 and 5 respectively.

A torpedo or explosive shell 6 of any suitable or preferred description is mounted upon and secured to the truck frame 1. The wheels 5 constitute the propelling wheels of the torpedo, said wheels being geared to and driven by an engine or motor 7 of any suitable or preferred type mounted upon the frame 1. Secured to the bottom of the frame 1 are hangers 8 and journaled in said hangers is the shaft 9 of a drum 10 having wound thereon electrical circuit wires 11, said drum being connected by a suitable rotary brush or the equivalent and wires 12 to the torpedo 6 so that the latter may be fired at any moment when the torpedo has reached the desired position in relation to the enemy. The extremities of the wires 11 may be fastened or anchored in any suitable way so that as the land torpedo proceeds toward its destination, the current wires will automatically unwind from the drum 10. Then at the proper moment and by means of a switch 13 connected to a suitable source of electrical energy 14 such as a battery, a spark may be delivered to the torpedo 6 igniting and exploding the latter.

In order to enable the land torpedo to successfully negotiate rough ground and ascend an incline from a trench, the frame 1 is provided at the end thereof with a runner-like prow or fender 15 which is rigidly attached to the truck frame and curves upwardly as shown in Fig. 1. This enables the torpedo to ride over any reasonable obstruction in the path of movement thereof.

The wheeled truck may be cheaply manufactured and land torpedoes constructed as hereinabove described and shown may be despatched in large quantities either during the action or prior to an attack so as to be in readiness therefor. They may then be discharged separately or collectively at the proper time to do the greatest damage.

I claim:—

In combination with a land torpedo, comprising a wheeled truck having propelling means and having a torpedo supported by and secured longitudinally thereon; of a fender comprising a curved member having its lower end secured centrally to the front of the truck and disposed upwardly of the torpedo and terminating in a line with the center and above the torpedo, and angle brace means between the side of the fender member, and the front of the truck.

In testimony whereof I affix my signature.

EDWARD GRAHAM.